United States Patent [19]
Biernat et al.

[11] Patent Number: 6,000,118
[45] Date of Patent: Dec. 14, 1999

[54] METHOD OF FORMING A SEALED EDGE JOINT BETWEEN TWO METAL PANELS

[75] Inventors: David M. Biernat, Grosse Pointe Park; George Wagner, Sterling Heights; Andy Kalson, Jr., Rochester Hills; Dennis D. Davidson, Troy; Robert Shaffer, Franklin Village, all of Mich.

[73] Assignee: Chrysler Corporation, Auburn Hills, Mich.

[21] Appl. No.: 09/183,535

[22] Filed: Oct. 30, 1998

[51] Int. Cl.⁶ .............................. B23P 25/00; B21D 35/00
[52] U.S. Cl. .......................... 29/458; 29/469.5; 29/509; 156/196; 156/216; 156/295
[58] Field of Search ..................... 29/509, 243.5, 29/243.57, 243.58, 458, 469.5; 156/196, 216, 295, 310, 307.3

[56] References Cited

U.S. PATENT DOCUMENTS

| | | |
|---|---|---|
| 2,650,185 | 8/1953 | Larson et al. |
| 3,970,502 | 7/1976 | Turner ........................ 156/310 |
| 4,131,980 | 1/1979 | Zinnbauer ................... 29/463 |
| 4,136,438 | 1/1979 | Mallory ....................... 29/509 |
| 4,398,984 | 8/1983 | Uchiyama et al. ........... 29/469.5 |
| 4,719,689 | 1/1988 | Yamamoto et al. .......... 29/458 |
| 5,273,606 | 12/1993 | Greve et al. ................. 29/509 |
| 5,394,754 | 3/1995 | Herring, Jr. .................. 73/826 |
| 5,470,416 | 11/1995 | Herring, Jr. et al. ......... 156/196 |
| 5,587,042 | 12/1996 | St. Denis ..................... 156/216 |
| 5,632,413 | 5/1997 | Herring, Jr. et al. ......... 222/1 |
| 5,720,144 | 2/1998 | Knudson et al. ............. 52/731.9 |
| 5,730,446 | 3/1998 | Taylor et al. ................. 277/312 |
| 5,749,992 | 5/1998 | Eklund et al. ................ 156/212 |

*Primary Examiner*—David P. Bryant
*Attorney, Agent, or Firm*—Lawrence J. Shurupoff

[57] ABSTRACT

A sealed edge joint can be formed between two metal panels such as an outer vehicle door panel and an inner door panel, by using a flowable sealant bead between the facing surfaces of the two panels, and a thin film of uncured paint-like resin between a flange on the outer panel and the exposed surface of the inner panel. The paint film is cured to a solid impervious condition by a baking operation performed on the completed door panel assembly.

6 Claims, 1 Drawing Sheet

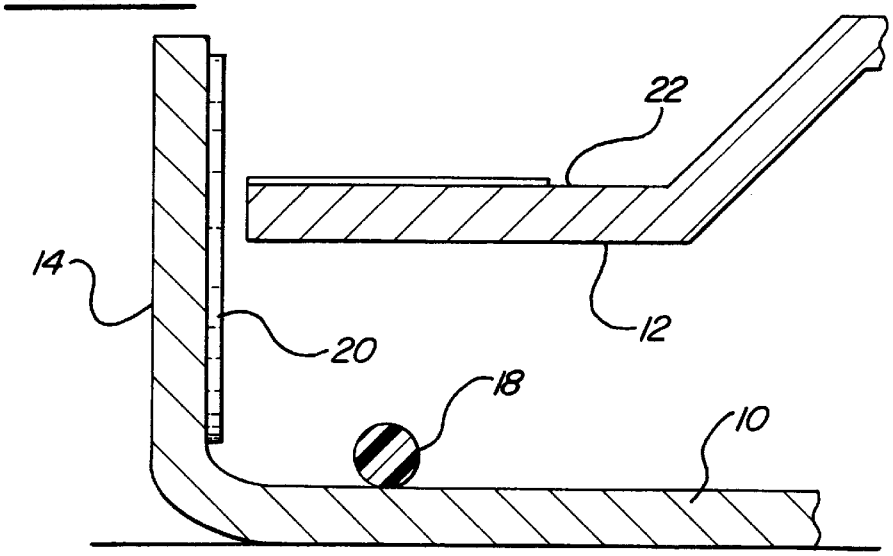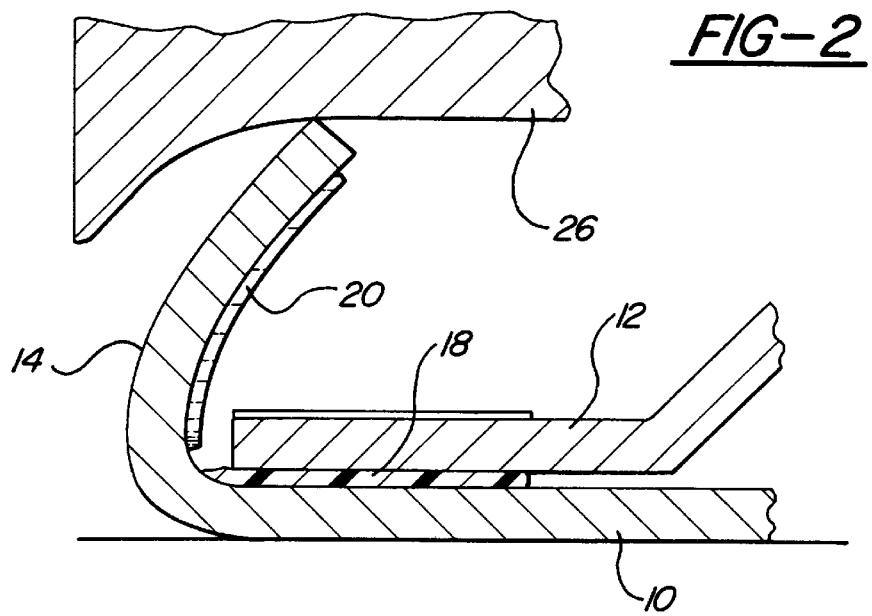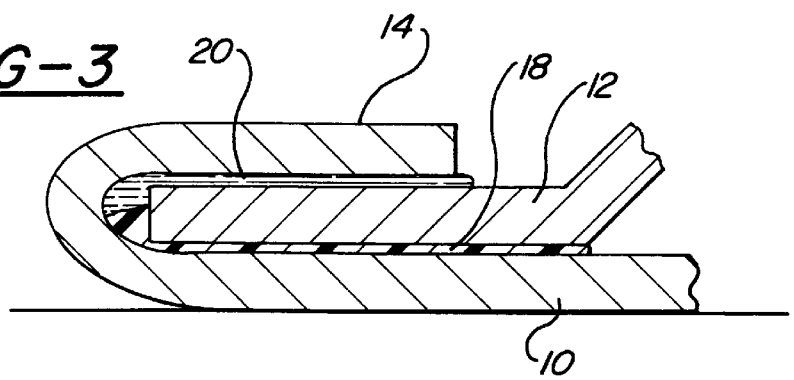

METHOD OF FORMING A SEALED EDGE JOINT BETWEEN TWO METAL PANELS

BACKGROUND OF THE INVENTION

1. Field of the Invention

This invention relates to a sealed edge joint between two metal panels, e.g. an edge joint between a vehicle door outer panel and inner panel. The invention addresses the problem of forming a corrosion resistant edge joint in a production environment.

2. Description of Prior Developments

U.S. Pat. No. 4,719,689, issued to S. Yamamoto, discloses a method of forming a corrosion-resistant edge joint between two automotive vehicle panels, wherein a flowable sealant bead placed on one of the panels is spread along the panel joint by the operation of pressing the panels together, and turning a flange on one of the panels onto the exposed face of the other panel.

U.S. Pat. No. 5,470,416, issued to J. Herring, discloses a flowable sealant material that includes a flowable base material and glass bead additive in a concentration up to about 20% of the sealant material weight. The glass beads limit the pressure on the flowable component so as to prevent the flowable component from extruding out of the sealed joint.

U.S. Pat. No. 5,749,992, issued to K. Eklund et al, describes a method of forming a seal edge joint wherein multiple beads of flowable sealant material are deposited on different surfaces of the panels, so that when the panels are pressed together the flowable materials merge together to form a substantially continuous sealing connection between the two panels.

SUMMARY OF THE INVENTION

The present invention relates to a method of forming a sealed edge joint between two panels, wherein two separate sealing materials are used. A bead of flowable sealant is utilized between mating flat surfaces on the two panels. Additionally, a substantially dry film of heat-curable material is used between a flange on one of the panels and an otherwise exposed surface of the other panel. Because the heat curable material is substantially dry rather than substantially flowable, and because it is applied as a very thin film compared to prior tacky adhesive sealants, little if any curable material is extruded from the joint. During flange bending, this is most advantageous, as this dry material does not contaminate the tooling. This allows the use of existing tooling without special modifications to accommodate flowing sealant.

The flange is turned onto the other panel, after which the heat-curable material is baked to form a corrosion-resistant joint between the flange and other panel.

Further features of the invention will be apparent from the attached drawings and description of an illustrative sealed joint formed by the method of this invention.

BRIEF DESCRIPTION OF THE DRAWINGS

FIG. 1 is a cross sectional view taken through edge areas of two panels adapted to be joined together by the method of the present invention.

FIG. 2 is a view taken in the same direction, as FIG. 1 but at a later stage in the method of joining the panels together.

FIG. 3 is a view taken in the same direction as FIG. 1, but after the panels have been joined together.

DESCRIPTION OF A PREFERRED EMBODIMENT OF THE INVENTION

FIG. 1 shows edge areas of two metal panels 10 and 12 that are to be joined together by the method of the present invention. In one contemplated application, panel 10 is the outer panel of a vehicle door, and panel 12 is the inner panel of the door. The panels are joined together by means of an edge flange 14 extending from panel 10. As shown in FIG. 1, flange 14 extends right angularly from panel 10. The flange can be turned onto a face area of panel 12 to secure the two panels together. FIG. 3 shows the two panels after they have been joined together.

The present invention contemplates a method of joining the panels together to provide a sealed joint resistant to corrosion, particularly corrosion along opposite faces of panel 12. As an initial step, a bead of flowable sealant 18 is deposited on panel 10 alongside flange 14. The sealant bead is coextensive with the length of the joint that is to be formed. The sealant bead can be formed of a plastic or elastomeric adhesive material, e.g. an epoxy, or a vinyl adhesive, or adhesive elastomer. Typically the sealant is a tacky material having the ability to flow under pressure so as to form a face seal between panels 10 and 12.

As an additional step in the invention method, a thin film of a heat-curable material 20 is sprayed, or otherwise applied, on flange 14. In an alternative procedure under this invention, the film of heat-curable material can be formed on the upper surface 22 of panel 12 as shown in dashed lines in FIGS. 1 and 2, or applied to both flange 14 and surface 22.

The heat-curable material is preferably paint, e.g. a commercially available paint having a corrosion inhibitor incorporated therein. Typically the paint will be in liquid form. However, the paint can be a powder material in a liquid carrier, or a powder resin material without a carrier solvent. Such powder paints are of the type used for anti-chip coatings on vehicle bodies. A primary requirement is that the material be in an uncured state, such that after the material has been heated, or baked, a solid impervious coating is formed. Another significant requirement is that after the material is applied, prior to the metal forming operation and before being heated, the material achieves an uncured non-tacky, dried state. This allows use of existing tooling used to form the joint, and does not require special tooling die modifications to accommodate "squeeze out" of the sealant material 20 insofar as squeeze out and transfer to the tooling and subsequent contamination is minimized or virtually eliminated by the use of a dried sealant material. An example of a suitable material for material 20 is commercially available powder anti-chip paint coating of the type used in automobile manufacture.

First moving panel 12 forms the joint downwardly into pressure contact with the sealant bead 18, as shown in FIG. 2. A relatively light pressure on panel 12 causes the sealant material to spread laterally in both directions (left and right) to form a scaled connection between panels 10 and 12, as depicted in FIG. 2.

Flange 14 is then turned onto the upper surface 22 of panel 12, e.g. by means of a vertically movable die 26, such that heat-curable film 20 is brought into contact with flange 12. The heat-curable film 20 has a non-tacky, dried state at this stage so that it does not flow, or spread, to the same extent as the adhesive sealant 18.

The application of a relatively heavy pressure on the exposed face of flange 14 causes sealant 18 and the uncured film 20 to spread sufficiently to substantially completely fill the U-shaped space formed by panel 10, panel 12, and flange 14. Film 20 forms a barrier to prevent the upward flow of sealant 18 around the edge of panel 12, whereby the entire interface is filled, without any voids or discontinuities.

After the FIG. 3 condition has been realized, the panel assembly is subjected to a heating or baking operation, so as to cure the film 20 into a solid impervious condition bonded to flange 14 and the upper face of panel 12. The cured film acts as an effective barrier against migration of corrosive electrolytes into the joint between panel 12 and flange 14.

Typically, the door panel assembly 10, 12 is painted shortly after the edge joint has been formed. Paint film 20 is cured as part of the process of painting and baking the paint colorant on the external surfaces of panels 10 and 12.

Panels 10 and 12 can be of any desired thickness. Sealant film 18 and paint film 20 each have a preferred thickness of less than 0.01 inch after the joint is completed as shown in FIG. 3. Preferably the process of forming the sealed edge joint is carried out so that very little, if any, of the paint film 20 extrudes out of the joint between panel 12 and flange 14. This is advantageous in that the joint has a good appearance.

What is claimed:

1. A method of forming a sealed edge joint between first and second metal panels, comprising the steps of:
    providing an edge flange on said first panel;
    depositing a bead of flowable sealant on said first panel alongside said flange;
    spraying a film of uncured material onto said flange;
    pressing said second panel against said sealant bead so that the sealant spreads across the joint between the two panels;
    turning the flange onto said second panel so that the uncured material film bonds to the second panel; and
    baking the uncured material to form a sealed connection between said flange and said second panel.

2. The method of claim 1, wherein the step of pressing the second panel against the sealant bead involves the application of a relatively light pressure on the second panel, and the step of turning the flange onto said second panel involves the application of a relatively heavy pressure on the flange.

3. The method of claim 1, wherein the bead of flowable sealant has a circular cross section.

4. A method of forming a sealed edge joint between first and second metal panels, comprising the steps of:
    providing an edge flange on said first panel;
    depositing a bead of flowable sealant on said first panel alongside said flange;
    forming a film of heat-curable bonding material on one of said flange and said second panel;
    pressing said second panel against said sealant bead so that the sealant spreads across the joint between the two panels;
    turning the flange onto the second panel so that the film of heat-curable material is bonded to the second panel and to the flange; and baking the heat curable material to form a sealed connection between said flange and said second panel.

5. The method of claim 4, wherein the step of pressing the second panel against the sealant bead is carried out at a relatively low pressure, and the step of turning the flange onto said second panel is carried out at a relatively high pressure.

6. A method of forming a sealed edge joint between first and second metal panels, comprising the steps of:
    providing an edge flange on said first panel;
    depositing a bead of flowable sealant on said first panel alongside said flange;
    spraying a film of uncured material onto said second panel;
    pressing said second panel against said sealant bead so that the sealant spreads across the joint between the two panels;
    turning the flange onto said second panel so that the uncured material film bonds to the first panel; and
    baking the uncured material to form a sealed connection between said flange and said second panel.

* * * * *